UNITED STATES PATENT OFFICE.

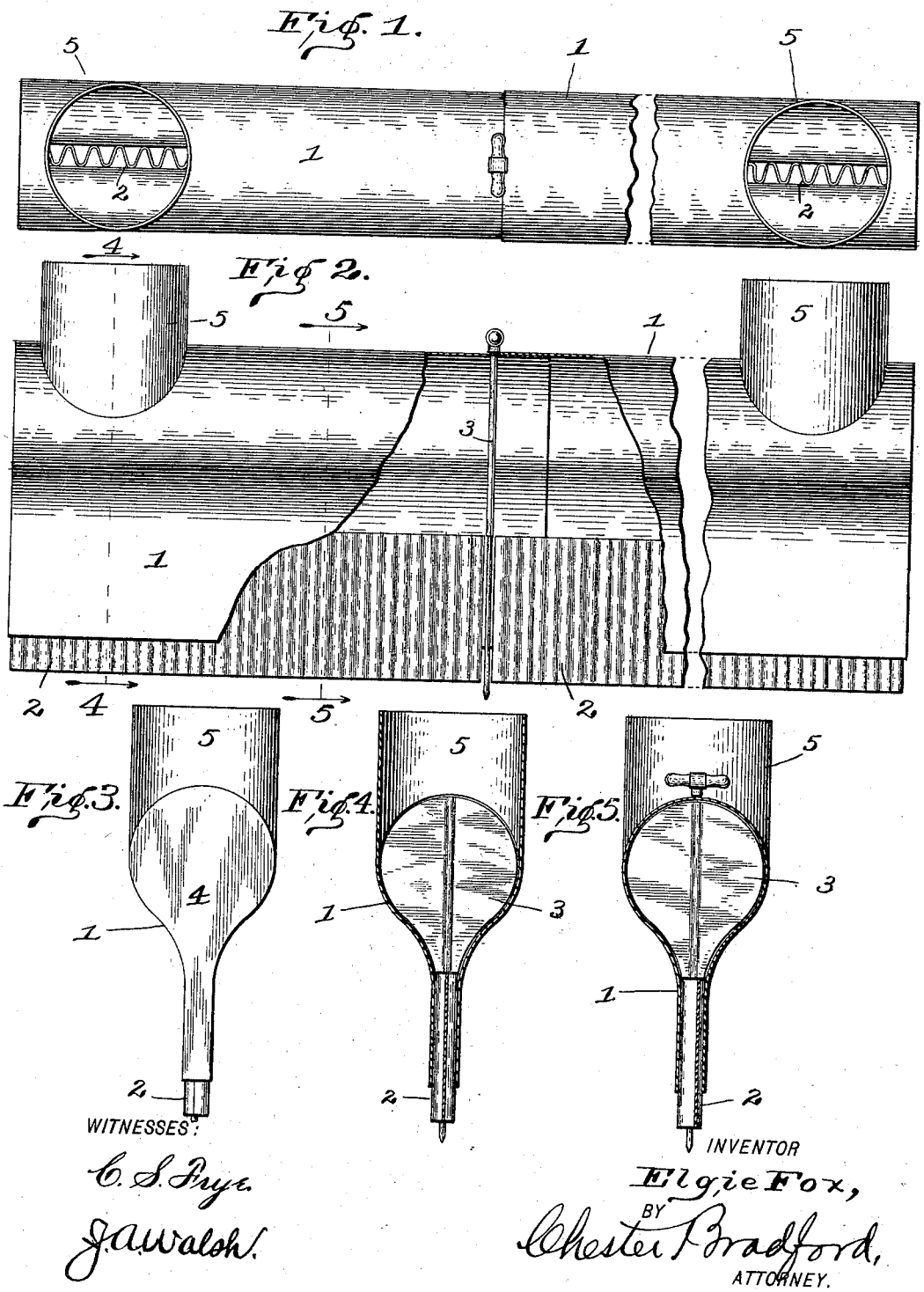

ELGIE FOX, OF RUSHVILLE, INDIANA.

CONDUIT FOR DISTRIBUTING FLUIDS.

SPECIFICATION forming part of Letters Patent No. 656,537, dated August 21, 1900.

Application filed November 22, 1899. Serial No. 737,882. (No model.)

*To all whom it may concern:*

Be it known that I, ELGIE FOX, a citizen of the United States, residing at Rushville, in the county of Rush and State of Indiana, have invented certain new and useful Improvements in Conduits for Distributing Fluids, of which the following is a specification.

The object of my invention is to provide a comparatively-inexpensive, easily handled, and portable means for distributing fluids, particularly for purposes of irrigation and plant-forcing; and it consists in a conduit of a peculiar construction and arrangement, as will be hereinafter particularly described and claimed.

Referring to the accompanying drawings, which are made a part hereof, and on which similar numerals of reference indicate similar parts, Figure 1 is a top or plan view of a section of conduit embodying my said invention, portions being broken away to show the interior; Fig. 2, a view partly in side elevation and partly in central section; Fig. 3, an end elevation; and Figs. 4 and 5, transverse vertical sections on the dotted lines 4 4 and 5 5, respectively, in Fig. 2.

My improved conduit should be formed of sheet metal, preferably galvanized iron. In forming it strips 1, of suitable width, are first sheared and then bent into substantially a balloon shape in cross-section, as indicated in Figs. 3, 4, and 5. Between the edges are then inserted corrugated strips 2, the corrugations forming small distribution-openings leading from the main conduit to the outside thereof. These corrugated strips should extend somewhat below the edges of the body portions, so that the fluid in passing out will be divided and alternate streams guided to some extent in each direction from the center, instead of all passing vertically downward. This aids much in proper irrigation of the surrounding earth when the conduits are in position and in use. When the conduits are used in an inclined position, especially on hillsides, gates 3 should be interposed at various points in order to check the flow longitudinally of the main conduit and insure its sufficiently-rapid passage out through the distribution-openings. At the termination of any particular conduit as a whole a solid end 4 is inserted therein, and where short-length sections are used, as in flower-beds, plant-propagation beds, and the like, where the fluid is introduced by being poured in by hand vessels, both ends of each section should be so stopped. In the case last described I usually provide one or more upwardly-extending tubular openings 5, through which the fluid may be introduced.

This conduit is, as above stated, commonly employed in flower-beds and plant-propagation beds in hot-houses and gardens for purposes of ordinary irrigation, and they are usually placed below the surface of the ground, although they may be placed at or above the surface. They may also be used for the purpose of distributing liquid fertilizers and, especially in the case of plant propagation, steam or hot air, by which the earth may be given a raised temperature artificially. It will of course be readily understood that these conduits can be coupled together end to end and long lengths thus formed when desired. In comparatively-large establishments where the fluid is received through pipes, as from ordinary waterworks and the like, as large a series of these conduits as may be desired may be coupled together in one system and the water introduced therein at some convenient central point and flow out in the desired direction therefrom, as will be readily understood.

Having thus fully described my said invention, what I claim as new, and desire to secure by Letters Patent, is—

1. A conduit composed of sheet metal the edges whereof are folded around near together, and a corrugated strip inserted between said edges whereby numerous distribution-orifices are formed at said point.

2. A conduit composed of sheet metal folded around into substantially a balloon shape in cross-section, and a corrugated strip inserted between the edges of said sheet where they approach each other, whereby a tubular space for the passage of the fluid is formed with radial distribution-openings, substantially as shown and described.

3. A conduit composed of sheet metal the edges whereof are folded around near together, and a corrugated strip inserted between said edges and projecting beyond them, the spaces within the corrugations forming distribution-openings, and said distribution-openings being thus separated to a point below the point of discharge, whereby a portion of the fluid is directed toward one side of the structure and another portion toward the other side, substantially as set forth.

4. A conduit composed of sheet metal the edges whereof are folded around near together and projected radially outward, a part inserted between the edges whereby they are separated and distribution-openings formed, and openings in the upper side of the conduit through which a fluid may be introduced, substantially as set forth.

5. The combination, in a conduit, of the outer shell composed of a sheet the edges whereof are brought near together, a corrugated part inserted between said edges thus forming distribution-openings, and gates inserted in said conduits at suitable points whereby the flow of fluid may be controlled, substantially as and for the purposes set forth.

In witness whereof I have hereunto set my hand and seal, at Indianapolis, Indiana, this 18th day of November, A. D. 1899.

ELGIE FOX. [L. S.]

Witnesses:
CHESTER BRADFORD,
JAMES A. WALSH.